(12) United States Patent
Noble

(10) Patent No.: US 6,817,347 B2
(45) Date of Patent: Nov. 16, 2004

(54) FUEL CONVERTER

(76) Inventor: Paul Noble, 358 S. 700 East, #245, Salt Lake City, UT (US) 84102

( * ) Notice: Subject to any disclaimer, the term of this patent is extended or adjusted under 35 U.S.C. 154(b) by 0 days.

(21) Appl. No.: 10/246,845

(22) Filed: Sep. 18, 2002

(65) Prior Publication Data

US 2003/0131830 A1 Jul. 17, 2003

Related U.S. Application Data

(60) Provisional application No. 60/323,266, filed on Sep. 18, 2001.

(51) Int. Cl.$^7$ .............................................. F02M 31/18
(52) U.S. Cl. ....................................... 123/536; 123/543
(58) Field of Search ................................ 123/536, 537, 123/538, 539, 543–557, 3

(56) References Cited

U.S. PATENT DOCUMENTS

| | | | |
|---|---|---|---|
| 4,147,136 A | * | 4/1979 | Noguchi et al. ................ 123/3 |
| 4,267,976 A | * | 5/1981 | Chatwin ...................... 123/538 |
| 4,620,511 A | * | 11/1986 | Brooks et al. .......... 123/145 A |
| 5,033,444 A | | 7/1991 | Kaufman et al. |
| 5,346,391 A | | 9/1994 | Fullemann et al. |
| 5,408,973 A | * | 4/1995 | Spangjer ...................... 123/538 |
| 6,077,620 A | | 6/2000 | Pettit |
| 6,232,005 B1 | | 5/2001 | Pettit |
| 6,311,650 B1 | | 11/2001 | Lamm |
| 6,427,639 B1 | * | 8/2002 | Andrews et al. ............ 123/539 |

* cited by examiner

Primary Examiner—Marguerite McMahon
(74) Attorney, Agent, or Firm—Thorpe North & Western

(57) ABSTRACT

A system for converting motor fuel, comprising an air intake system, an injector nozzle, a heater, and a catalyst. The injector nozzle injects motor fuel into the air intake to produce an air-fuel mixture. The heater vaporizes the air-fuel mixture, and the catalyst causes hydrogen to be removed from the motor fuel molecules so as to produce a gaseous mixture of air, motor fuel, and free hydrogen suitable for combustion in an internal combustion engine. The system works with a wide variety of motor fuels, and provides greater fuel efficiency and lower emissions.

33 Claims, 2 Drawing Sheets

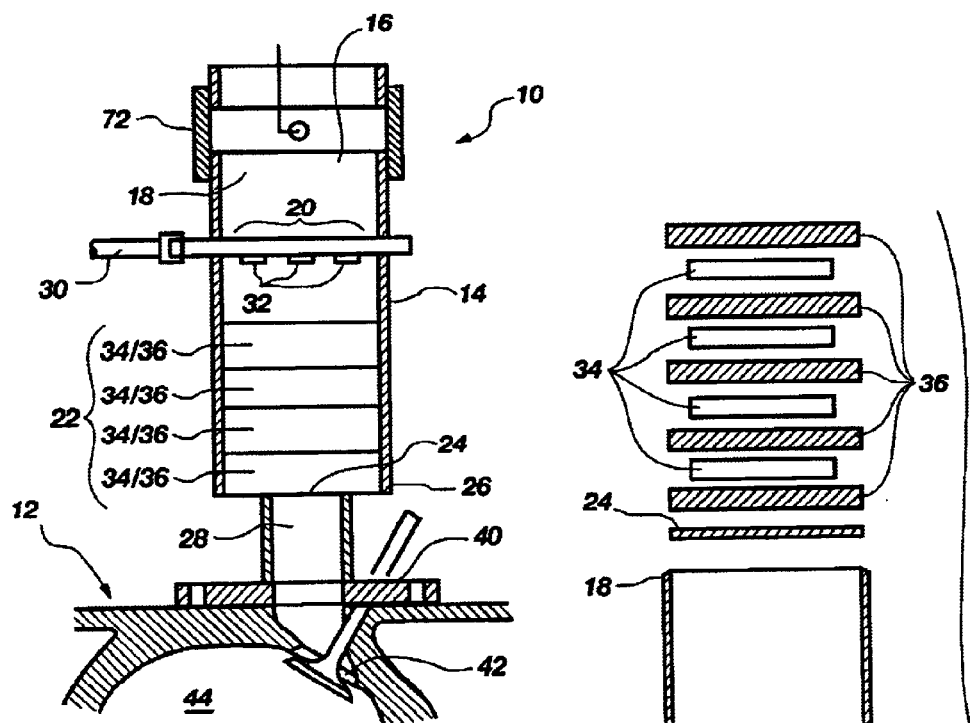
FIG. 1
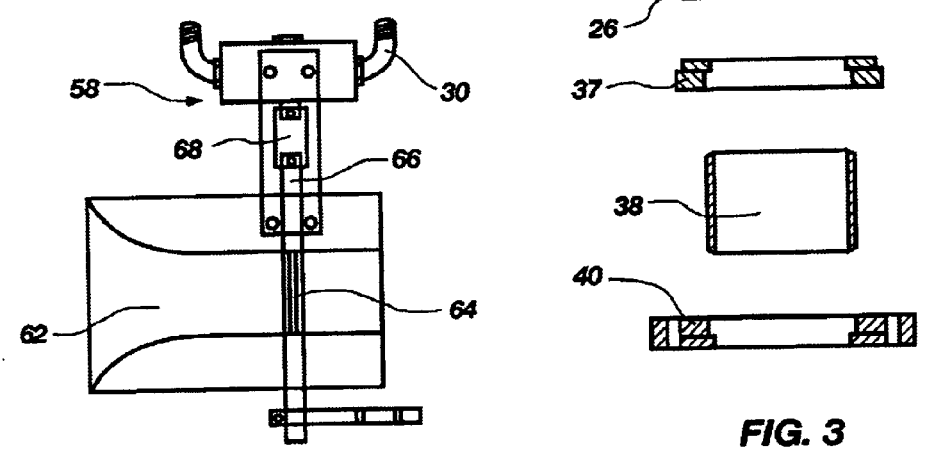
FIG. 2
FIG. 3

FUEL CONVERTER

The present application claims priority from U.S. Provisional Patent Application No. 60/323,266, filed on Sep. 18, 2001, and entitled FUEL CONVERTER.

BACKGROUND OF THE INVENTION

1. Field of the Invention

The present invention relates generally to motor fuel conditioning systems. More particularly, the present invention relates to a system for converting liquid motor fuel into a vaporized mixture of motor fuel and free hydrogen immediately before combustion in an engine.

2. Related Art

Internal combustion piston engines are notoriously inefficient. While great improvements have been made in automobile fuel efficiency over the past 25 years or so, most automobile engines still have efficiencies in the range of 20%. This low level of efficiency leads to several problems. Obviously, it imposes a relatively high expense for fuel to operate the vehicle. Second, it consumes large quantities of a finite natural resource—crude oil. Finally, inefficient engines create pollution, largely because relatively large quantities of fuel remain unburned, and simply go down the exhaust pipe.

When liquid motor fuel is introduced into an internal combustion engine, whether through carburetion or fuel injection, the fuel is typically introduced as an aerosol—small droplets of liquid dispersed in air. This is true whether the fuel is gasoline, diesel, kerosene, propane, etc. The speed of combustion of the fuel is directly related to the total surface area—and hence the size—of the fuel droplets. The smaller the droplets, the faster and more complete the combustion. However, the fuel is generally still a liquid, and the brief time of combustion is insufficient to allow complete burning of the fuel. Thus, to obtain the desired combustion energy, more fuel than is theoretically needed must be introduced into a cylinder for each combustion cycle. The excess simply goes down the exhaust pipe and becomes air pollution.

It has been known for some time that if motor fuel is vaporized—i.e. completely converted to a gaseous vapor before burning—combustion is more complete. The result is much higher efficiency, and lower emissions. In fact, where gaseous fuels are burned, complete or nearly complete combustion is possible even with very rapid reactions, allowing vast increases in efficiency and reductions in emissions.

However, while this principle has been understood for decades, it has not been applied generally. There area a couple of reasons for this. One relates to the difficulty of handling gaseous fuels. When in a liquid form, motor fuels are relatively safe and simple to handle. Liquids are less volatile, and can be easily pumped, etc. However, vaporized motor fuels are far more volatile and difficult to handle. Another issue is safety. A number of systems for vaporizing motor fuels have been tried, including systems that use engine exhaust or coolant heat to vaporize the fuel. Unfortunately, these various attempts have generally proven ineffective and sometimes dangerous, resulting in accidents and injuries. Consequently, such systems have not been put into use.

With concerns over diminishing oil reserves and increasing air pollution, alternative fuels have also become a focus of increasing consideration and study. As a potential motor fuel, hydrogen presents some excellent possibilities. Hydrogen is a very powerful combustion agent, and is as clean a fuel as could be imagined. The only byproduct of hydrogen combustion is water—no particulates, no greenhouse gasses, no pollutants of any kind. Unfortunately, the production of elemental hydrogen requires considerable input of energy, with the result that pure hydrogen fuel is very expensive. It is also somewhat difficult to handle, frequently requiring cryogenic equipment and high pressure vessels for storage. Consequently, the use of hydrogen as a motor fuel has not developed very far.

SUMMARY OF THE INVENTION

It has been recognized that it would be advantageous to develop a viable motor fuel system that can allow the safe vaporization of motor fuels for use in internal combustion engines in gaseous form.

It would also be desirable to obtain the benefits of hydrogen fuel when using a conventional motor fuel.

The invention provides a system for converting motor fuel, comprising an air intake system, an injector nozzle, a heater, and a catalyst. The injector nozzle injects motor fuel into the air intake system to produce an air-fuel mixture. The heater vaporizes the air-fuel mixture, and the catalyst causes hydrogen to be removed from the motor fuel molecules so as to produce a gaseous mixture of air, motor fuel, and free hydrogen suitable for combustion in an internal combustion engine. The system works with a wide variety of motor fuels, and provides greater fuel efficiency and lower emissions.

In accordance with another aspect of the present invention, the invention provides an internal combustion engine, comprising an engine body, an air intake system, a fuel delivery system, a heating system, and a catalyst. The engine body includes a cylinder with an inlet, and the air intake system is coupled to the cylinder inlet. The fuel delivery system includes an injector nozzle, configured to inject motor fuel into the air intake system, so as to produce an air-fuel mixture which is vaporized by the heating system. The catalyst is disposed between the heating system and the inlet of the cylinder, and is configured to remove free hydrogen from the motor fuel by a catalytic reaction as the vaporized air-fuel mixture passes thereover, such that the fuel that enters the inlet of the cylinder for combustion comprises a gaseous mixture of motor fuel and free hydrogen.

In accordance with a more detailed aspect of the present invention, the heating system comprises a series of porous ceramic disks, which heat the air-fuel mixture as it passes therethrough. In one embodiment the catalyst comprises a mesh screen, made of an alloy of about 60% platinum, 30% iridium, and 10% palladium.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 1 is a side cross-sectional view of a single fuel converter unit in accordance with the present invention.

FIG. 2 is a close-up top view of the mechanically linked fuel control valve and air inlet control valve shown in FIG. 4.

FIG. 3 is an exploded view of the fuel converter tube of the converter unit of FIG. 1.

DETAILED DESCRIPTION

Figure 4:
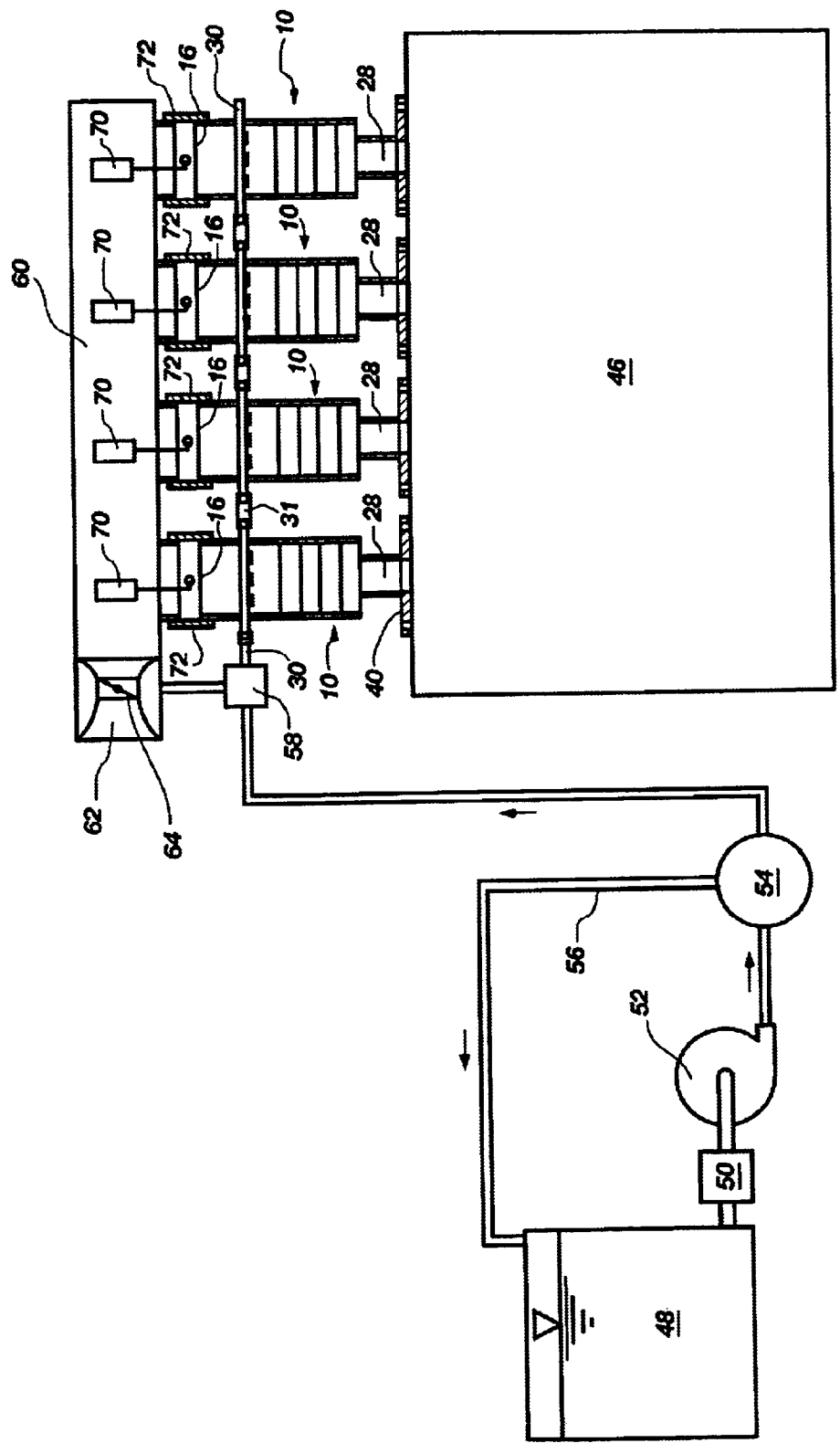
FIG. 4 is a semi-schematic diagram of a fuel converter system installed on a four-cylinder engine.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The invention advantageously provides a fuel converter that both vaporizes motor fuel and catalytically reforms it to provide a mixture of the motor fuel and free hydrogen. With reference to FIG. 1, a fuel converter 10 in accordance with the present invention is configured to attach to an internal combustion engine 12, and generally comprises a converter tube 14 having an air inlet 16 toward its top 18, a fuel injection system 20 extending through a middle portion of the converter tube, a heating system 22, a catalyst 24 disposed toward the bottom 26 of the converter tube, and an outlet 28. The system is generally configured to draw in air and produce an air-fuel mixture via the fuel injection system, vaporize the motor fuel via the heating system, and then remove hydrogen from the hydrocarbon molecules of the fuel via the catalyst, to produce a gaseous mixture of air, motor fuel vapor, and free hydrogen. This mixture is then introduced into the internal combustion engine, where it burns more completely and cleanly than a liquid fuel or an unconverted fuel, producing far greater efficiency, and fewer pollutants.

The fuel injection system 20 generally comprises a fuel conduit 30 and fuel injectors 32. The size and number of injector nozzles is dependent upon the size and needs of the engine that the system is attached to. In the embodiment shown in FIG. 1, the fuel injection system includes three injector nozzles. A suitable injector nozzle that the inventor has used is a Westgate # MC08-10-24 Brass with stainless steel orifice (0.008" diameter). In another embodiment, the inventor has used custom-made micro nozzles having an opening of 0.005" in diameter. This system is lightweight, durable and easily adaptable to almost any type or size engine. It effectively breaks down fuels of the standard feed stock types (including diesel #1 and #2, gasoline, methanol and dimethyl ether) into droplets in the 10 micron range—essentially a fine vapor.

The injected fuel initially mixes with air in the upper portion of the converter tube before passing on to the heating system 22. The heating system can be configured in various ways. In the embodiment shown in FIGS. 1 and 3 it comprises a series of heated ceramic discs 34 disposed in a stack. The ceramic disks are multi-porous ceramic heating discs made from a mixture of powdered barium and powdered titanium, which are compressed to form barium titanate. The mixture and the thickness determine the resistance of the discs to electricity, and hence the temperature they will attain. The disc surfaces are coated on both sides with zinc (3 mils thick), which is etched into the surface. The sides facing the injectors are coated with brass (2 mils thick) to maintain even heat. These ceramic discs are arranged in series and held in place by metal rings 36. The air-fuel mixture is heated as it passes through the pores of the discs, causing the fuel to substantially completely vaporize or gasify. The entire tube system may be made of aluminum alloy, with all seams TIG welded for strength and durability. The converter tube assembly may be coated on the inside with Teflon 2 to prevent wear.

The converter assembly 10 will maintain its temperature up to the maximum flow rate of the heating discs 34. This range must remain consistent. The temperature required for complete gasification will vary depending on the fuel, and may range from about 540° F. to 870° F. In one embodiment, using #2 diesel fuel, the heater 22 is intended to heat the air-fuel mixture to a temperature of about 540° F. Different temperatures will be required for different fuels.

The vaporized air-fuel mixture then passes to the catalyst 24. The catalyst consists of a series of circular screens made up of a fine mesh (e.g. size 400) electrostatically plasma plated with a suitable catalyst material. One suitable catalyst configuration is about 60% platinum, about 30% iridium, and about 10% palladium. Another catalyst combination that the inventor has used is 60% platinum and 40% iridium. The catalyst mesh screens are positively electrically charged, for reasons that will become more apparent hereafter. The catalyst causes a quantity of free hydrogen to be released from the fuel molecules, thus producing a gaseous mixture of air, vaporized fuel, and free hydrogen. In one embodiment, the system is configured to produce from about 5% to about 6% free hydrogen by volume in the air-fuel mixture. However, production of significantly larger proportions of hydrogen is also possible. This gaseous mixture then flows through the converter outlet 28 and into the engine 12 for combustion.

Excessive delay between conversion of the fuel-air mixture and its combustion is undesirable. If the mixture becomes too cool, the fuel will begin to congeal and clog the system. If it becomes too hot, carbon will tend to build up and, again, clog the system. Excessive cooling of the vaporized air-fuel mixture can also allow back reactions of the free hydrogen, thus reducing its concentration.

A bottom ring 37 is disposed at the bottom end 26 of the converter tube 14 to support the stack of heating discs 34 and the catalyst 24. The outlet 28 of the converter 10 includes a coupler tube 38 and mounting flange 40 that allow it to be connected to the engine 12. As shown in FIG. 1, the outlet of the converter may communicate directly with an intake valve 42 of a single cylinder 44. In this configuration, the converter may take the place of a conventional fuel injector. Such a configuration can be applied to a single cylinder engine, or a multi-cylinder engine. Alternatively, a single converter can be connected to the intake manifold of a multi-cylinder engine, and provide a converted, vaporized air-fuel mixture for all cylinders. Naturally, the dimensions of the converter will depend on the flow rate of fuel and air that must pass through it.

Depicted in FIG. 4 is a four cylinder engine 46 with a fuel converter system attached. The system includes four converter units 10 that are each associated with one of the cylinders of the engine, and connected to a common fuel supply line or conduit 30 that provides liquid fuel to the injectors in each converter. Sequential fuel line segments are connected by couplers 31. The fuel delivery system for providing fuel to the fuel supply line includes a fuel supply tank 48, a fuel filter 50 (e.g. a high efficiency magnetic racing-type fuel filter that can trap particles down to the 1200 AU size), a high pressure racing-type injector pump 52 (e.g. Bosch 5131 or equivalent), and an adjustable pressure regulator 54 (e.g. Performance Products 2303 or equivalent). The regulator includes an overflow conduit 56, which returns any unused portion of fuel to the fuel tank. Finally, the fuel passes through a fuel metering valve 58 (e.g. Hilborn Model SW with rotor #71) before it enters the final portion of the fuel line 30 to be supplied to the injector nozzles. In the configuration shown, the injector pump must be able to maintain a pressure of about 50–100 psi for the injector nozzles.

The air inlet 16 of each converter 10 in the series is connected to a common air plenum 60 via flexible tubing couplers 72. The air plenum includes a single inlet orifice venturi tube 62 and a butterfly valve 64 for air flow control. The plenum can be made of aluminum or PVC schedule 20, or other suitable material. It will be apparent that the size of the air plenum and venturi are dependent upon the size and needs of the engine that the system is attached to. Viewing FIGS. 2 and 4, the butterfly valve is controlled by a butterfly valve shaft 66 in the venturi tube, which is connected by a linkage 68 to the control shaft of the fuel metering valve 58. This way the flow rate of both air and fuel are commonly controlled so as to maintain greater control over the air fuel ratio.

Referring back to FIG. 4, disposed within the air plenum 60 are a series of electrodes 70, one for each converter unit 10. The electrodes impose a high voltage static charge on the incoming air to ionize and stratify the air. Using ionized air for mixing with the fuel assists the breakdown of the long chain hydrocarbons when the air-fuel mixture passes over the catalyst. In one embodiment, the electrodes provide a negative 20,000 volts DC (at very low amperage) using a type IU-SS010S ionizer. In another embodiment, the air is stratified with a negative 100,000 VDC static charge. Power to the electrodes is provided by a transistor oscillator, a step up transformer, and a voltage multiplier (not shown). In one embodiment, the inventor has used an Onan 20 kw Gen-Set Model GGDB with a British Ford Model LRG-425 153 CID electrically sparked Gasoline engine.

By electrostatically charging the incoming air, the vaporized air-fuel mixture becomes a negatively charged gas that is electrically attracted to the positively charged metal catalyst 24. As the vaporized fuel passes through the catalyst, it attaches itself momentarily to the positively charged catalyst mesh screen. It is at this point that hydrogen is "cracked" from the fuel, and allowed to mix with the fuel to be burned together in the combustion chamber of the engine. Thus, charging the incoming gas both assists the breakdown of the motor fuel molecules, and also increases the speed and efficiency with which the air and fuel pass through the converter.

The amount of hydrogen cracked from the fuel can vary from less than 3% to as much as 35%, depending of the type of fuel used and external conditions. The range of 5–6% hydrogen is presently considered the most practical range. If a 3–6% mixture of hydrogen is added to the fuel for combustion in an engine, pollution is greatly reduced, and performance is increased because combustion efficiency is improved. In experiments with electrical generators powered by conventional internal combustion engines (both gasoline and diesel), the inventor has found that run time on a given volume of motor fuel is approximately doubled. Under some conditions, up to 3 times the normal run time has been achieved. Advantageously, this system appears to work with any type of hydrocarbon fuel, and is therefore extremely adaptable in the field to cars, trucks, marine, generators, and many other applications.

The major difference between this system and conventional engines is that other systems merely turn liquid fuels into aerosols by means of carburetion or fuel injection. This process is inefficient because aerosols still comprise relatively large liquid particles, which do not burn completely during the combustion phase in a piston engine. This causes engines to run poorly and increases emissions. The present system, however, first turns the fuel into a fine mist high-pressure nozzles, then heats the fuel through a series of heated ceramic elements to create a true rarefied gas. The rarified gas, which is electrically charged to −20 kv, is then forced through a catalytic metal alloy mesh. The resulting catalytic reaction releases hydrogen from the liquid fuel, allowing direct combustion of an air-fuel-hydrogen mixture.

There have been others that have used exhaust heat or coolant heat from an engine to make liquid fuels more efficient, but with little practical success. The present system can process many different fuel types. Kerosene, diesel, gasoline, alcohol, methanol, natural gas and propane. The efficiency will vary depending on the fuel and the amount of chemically available hydrogen in it. Any hydrogen-based fuel can be processed with this system, but number two diesel appears to provide the highest output improvement of all the fuels tried to date, and is also the cheapest. The system works on a standard sparked gas engine so it is very easy to adapt.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A system for converting hydrocarbon motor fuel, comprising:
   a. an air intake system;
   b. an injector nozzle, configured to inject hydrocarbon motor fuel into the air intake system and produce an air-fuel mixture;
   c. a heater, configured to vaporize the air-fuel mixture; and
   d. a catalyst, configured to remove free hydrogen from the motor fuel by a catalytic reaction as the vaporized air-fuel mixture passes thereover, so as to produce a gaseous mixture of motor fuel and free hydrogen suitable for combustion in an internal combustion engine, the gaseous mixture comprising from about 3% to about 35% free hydrogen by volume.

2. A system in accordance with claim 1, further comprising an electrode, disposed within the air intake system, configured to apply a high voltage static charge to ionize air that is drawn thereinto.

3. A system in accordance with claim 2, wherein the electrode is configured to apply a negative static charge of from 10 to 100 kv.

4. A system in accordance with claim 1, wherein the injector nozzle has an operating pressure of from about 50 psi to about 100 psi.

5. A system in accordance with claim 1, further comprising:
   a. a fuel metering valve, configured to control a flow of liquid motor fuel to the injector nozzle; and
   b. an air intake valve, configured to control a flow of air into the air intake system, the fuel metering valve and air intake valve having a common control apparatus, whereby an air-fuel ratio is simultaneously controlled by adjustment of the common control apparatus.

6. A system in accordance with claim 1, wherein the heater comprises an electrically-heated, porous ceramic disk, configured to heat the air-fuel mixture as it passes through pores of the disk.

7. A system in accordance with claim 6, wherein the porous ceramic disk comprises barium titanate.

8. A system in accordance with claim 6, wherein the ceramic disk is heated to a temperature of from about 540° F. to about 870° F.

9. A system in accordance with claim 6, wherein the heater comprises a plurality of electrically-heated, porous ceramic disks arranged in series.

10. A system in accordance with claim 1, wherein the catalyst is selected from the group consisting of platinum, iridium, and palladium.

11. A system in accordance with claim 10, wherein the catalyst comprises a metal alloy mesh through which the vaporized air-fuel mixture passes, the mesh being comprised of about 60% platinum, about 30% iridium, and about 10% palladium.

12. A system in accordance with claim 11, wherein the metal alloy mesh is positively electrically charged.

13. An internal combustion engine, comprising:
   a. an engine body, having a cylinder with an inlet;
   b. an air intake system coupled to the cylinder inlet;
   c. a fuel delivery system, including an injector nozzle, configured to inject hydrocarbon motor fuel into the air intake system, so as to produce an air-fuel mixture;
   d. a heating system, adjacent the air intake system, configured to vaporize the air-fuel mixture;
   e. a catalyst, disposed between the heating system and the inlet of the cylinder, configured to remove free hydrogen from the motor fuel by a catalytic reaction as the vaporized air-fuel mixture passes thereover, whereby the fuel that enters the inlet of the cylinder for combustion therein comprises a gaseous mixture of motor fuel and free hydrogen, comprising from about 3% to about 35% free hydrogen by volume.

14. An engine in accordance with claim 13, further comprising an electrode, disposed within the air intake system, configured to apply a high voltage static charge to ionize air that is drawn thereinto.

15. An engine in accordance with claim 14, wherein the electrode is configured to apply a negative static charge of from 10 to 1001 kv.

16. An engine in accordance with claim 13, wherein the fuel delivery system further comprises:
   a. a fuel storage tank; and
   b. a pump, configured to pump liquid fuel from the fuel storage tank to the injector nozzle, and to provide a pressure to the injector nozzle of from about 50 psi to about 100 psi.

17. An engine in accordance with claim 13, further comprising:
   a. a fuel metering valve, configured to control a flow of liquid motor fuel to the injector nozzle; and
   b. an air intake valve, configured to control a flow of air into the air intake system, the fuel metering valve and air intake valve having a common control apparatus, whereby an air-fuel ratio may be simultaneously controlled by adjustment of the common control apparatus.

18. An engine in accordance with claim 13, wherein the heater comprises an electrically-heated, porous ceramic disk, configured to heat the air-fuel mixture as it passes through pores of the disk.

19. An engine in accordance with claim 18, wherein the porous ceramic disk comprises barium titanate.

20. An engine in accordance with claim 18, wherein the ceramic disk is heated to a temperature of from about 540° F. to about 870° F.

21. An engine in accordance with claim 18, wherein the heater comprises a plurality of electrically-heated, porous ceramic disks arranged in series.

22. An engine in accordance with claim 13, wherein the catalyst is selected from the group consisting of platinum, iridium, and palladium.

23. An engine in accordance with claim 22, wherein the catalyst comprises a metal alloy mesh through which the vaporized air-fuel mixture passes, the mesh being comprised of about 60% platinum, about 30% iridium, and about 10% palladium.

24. An engine in accordance with claim 23, wherein the metal alloy mesh is positively electrically charged.

25. An engine in accordance with claim 13, wherein the engine body comprises a plurality of cylinders, with a separate (1) air intake system, (2) injector nozzle, (3) heating system, and (4) catalyst associated with each of the plurality of cylinders.

26. An internal combustion engine, comprising:
   a. an engine body, having at least one cylinder with an inlet;
   b. a fuel conversion apparatus, in fluid communication with the inlet, comprising:
      i. an air intake;
      ii. a fuel injector nozzle, configured to inject liquid hydrocarbon motor fuel into the air intake, so as to produce an air-fuel mixture;
      iii. a heater, adjacent the air intake system, configured to vaporize the air-fuel mixture; and
      iv. a catalyst, disposed between the heater and the inlet of the at least one cylinder, configured to remove free hydrogen from th motor fuel by a catalytic reaction as the vaporized air-fuel mixture passes thereover, whereby the fuel that enters the inlet of the cylinder for combustion comprises a gaseous mixture of motor fuel and free hydrogen, comprising from about 3% to about 35% free hydrogen by volume.

27. An engine in accordance with claim 26, further comprising:
   a. a plurality of cylinders; and
   b. a fuel conversion apparatus associated with each cylinder.

28. A method for converting motor fuel comprised of hydrocarbon chains into a gaseous mixture of motor fuel and free hydrogen, comprising the steps of:
   a. mixing liquid motor fuel with air to produce an air-fuel mixture;
   b. exposing the air-fuel mixture to heat so as to vaporize the air fuel mixture; and
   c. exposing the vaporized air-fuel mixture to a catalyst, so as to remove hydrogen molecules from the hydrocarbon chains by a catalytic reaction, so as to produce a gaseous mixture of motor fuel and free hydrogen comprising about 3% to about 35% free hydrogen by volume.

29. A method in accordance with claim 28, wherein the step of exposing the vaporized air-fuel mixture to a catalyst comprises exposing the vaporized air-fuel mixture to a metal alloy mesh comprising platinum, iridium, and palladium.

30. A method in accordance with claim 29, wherein the metal alloy mesh comprises about 60% platinum, about 30% iridium, and about 10% palladium.

31. A method in accordance with claim 28, wherein the gaseous mixture of motor fuel and free hydrogen comprises from about 5% to about 6% free hydrogen by volume.

32. A system in accordance with claim 1, wherein the gaseous mixture of motor fuel and free hydrogen comprises from about 5% to about 6% free hydrogen by volume.

33. A system in accordance with claim 13, wherein the gaseous mixture of motor fuel and free hydrogen comprises from about 5% to about 6% free hydrogen by volume.

* * * * *